United States Patent
Hibbets

(10) Patent No.: US 7,925,788 B2
(45) Date of Patent: Apr. 12, 2011

(54) SYSTEMS AND METHODS FOR UNIVERSAL PROTOCOL FOR CASE MANAGEMENT SYSTEMS

(75) Inventor: Jason S. Hibbets, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 121 days.

(21) Appl. No.: 12/039,971

(22) Filed: Feb. 29, 2008

(65) Prior Publication Data

US 2009/0222586 A1 Sep. 3, 2009

(51) Int. Cl.
*G06F 15/16* (2006.01)
*G06F 15/173* (2006.01)

(52) U.S. Cl. .................................. 709/246; 709/223

(58) Field of Classification Search .................... 709/246
See application file for complete search history.

(56) References Cited

U.S. PATENT DOCUMENTS

| | | | | |
|---|---|---|---|---|
| 5,339,434 A * | 8/1994 | Rusis | ........................... | 709/246 |
| 5,557,780 A * | 9/1996 | Edwards et al. | ................ | 703/27 |
| 2002/0100039 A1 * | 7/2002 | Iatropoulos et al. | ........... | 725/24 |
| 2002/0113817 A1 * | 8/2002 | Mitsugi | ........................ | 345/744 |
| 2004/0226031 A1 * | 11/2004 | Zimmerman et al. | ........ | 719/331 |
| 2009/0157903 A1 * | 6/2009 | Lewis et al. | .................. | 709/246 |

* cited by examiner

*Primary Examiner* — Joseph E Avellino
*Assistant Examiner* — Jeong S Park
(74) *Attorney, Agent, or Firm* — MH2 Technology Law Group LLP

(57) ABSTRACT

An embodiment relates generally to a method of communication between multiple case management systems. The method includes providing for a standard universal format that can be used for a plurality of case management systems, where each case management system is different from another, to communicate within the plurality of case management systems. The method also includes providing a plurality of classes based on the standard universal format and translating a native data for a trouble ticket based on a selected class associated with a first case management system to the standard universal format as a universal converted data packet. The method further includes transmitting the universal converted data packet to a second case management system.

11 Claims, 6 Drawing Sheets

300

| | |
|---|---|
| <CASE-ID> | 305 |
| <CASE-OWNER> | 310 |
| <CASE-SUMMARY> | 315 |
| <CASE-SEVERITY> | 320 |
| <CASE-STATUS> | 325 |
| <CASE-PRODUCT> | 330 |
| <CASE-PRODUCT-VERSION> | 335 |
| <CASE-DESCRIPTION> | 340 |
| <UNIVERSAL ID> | 345 |
| <ORIGIN> | 350 |
| <DESTINATION> | 355 |

FIG. 3

| | |
|---|---|
| <CLASS-EXPORT> | 300B |
| <CASE-ID> | 305 |
| <CASE-OWNER> | 310 |
| <CASE-SUMMARY> | 315 |
| <CASE-SEVERITY> | 320 |
| <CASE-STATUS> | 325 |
| <CASE-PRODUCT> | 330 |
| <CASE-PRODUCT-VERSION> | 335 |
| <CASE-DESCRIPTION> | 340 |
| <UNIVERSAL ID> | 345 |
| <ORIGIN> | 350 |
| <DESTINATION> | 355 |

FIG. 3B

SYSTEMS AND METHODS FOR UNIVERSAL PROTOCOL FOR CASE MANAGEMENT SYSTEMS

FIELD

This invention relates generally to case management systems, more particularly, to systems and methods for a universal protocol for communication between different case management systems.

DESCRIPTION OF THE RELATED ART

Computers and software have become critical tools in today's information based society. Computers and software have provided tools to users to greatly increase work efficiencies. However, with the advantages provided by computers and software come occasional technical problems associated with the computers and software applications. A typical solution to a computer and software technical problem is to contact a technical support person. A user can use a variety of methods to contact a technical support person, e.g., call a designated telephone number, open a chat session, send an email, etc. No matter which method a user chooses to contact a technical support person, a support ticket in a case management tool is created for a particular user's particular technical problem. Case management systems are generally well known systems such as Numara Help Desk™, Sinergia Help Desk™, Remedey Help Desk, Issue Tracker, SalesForce.com, etc.

The support ticket can initially contain a variety of information such as a description of the problem, i.e., a support issue, reporting user, assigned personnel, contact information, etc. As the support issue is resolved the support technician updates the support ticket with information describing how the solution was resolved. Once the support issue is resolved, the ticket and its respective solution are stored within a database of the case management system.

Typical scenarios that involve case management systems are limited to a single institution such as a corporation, a government agency, etc. However, as users purchase a wider variety of applications and/or hardware, the problems associated in resolving issues in these systems become increasing complex. As a result, a support engineer in an IT department of an institution may have to contact several vendors to resolve the various issues if the issue involves several applications and hardware platforms.

However, the vendors may use often use a different case management system to manage support issues from the users. Accordingly, a vendor has to enter the issue ticket by hand into his respective case management system to begin the solution process. Similarly, when an issue is resolved, the user has to manually take in the information from the vendor for the solution. The manual conversion from one case management system to another case management system can delay the resolution process when working with multiple vendors.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 3 depicts an exemplary universal protocol format for case management systems in accordance with various embodiments;

FIGS. 3B-D each illustrate an exemplary embodiments of classes in accordance with various embodiments;

Figure 1:
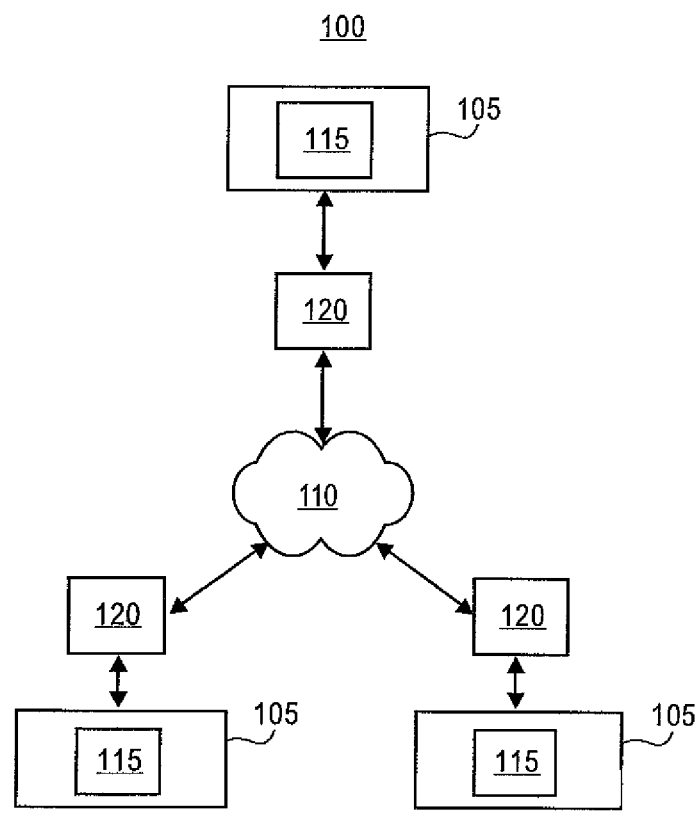
FIG. 1 depicts an exemplary system in accordance with an embodiment.

It will be appreciated that for simplicity and clarity of illustration, elements shown in the drawings have not necessarily been drawn to scale. For example, the dimensions of some of the elements are exaggerated relative to each other. Further, where considered appropriate, reference numbers have been repeated among the drawings to indicate corresponding elements and a repetitive explanation thereof will be omitted.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and case management systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments related generally to systems and methods for a universal protocol for case management systems. More particularly, a translator engine can be configured to convert data from a case management system ("CMS") into a standardized universal CMS format. The converted data, a universal CMS data package, can then be sent to any other type of case management system, which can then use a complementary translator engine to convert the data to the native data format of the destination CMS system.

The standardized format can comprise of fields such as identification number, owner of the issue, a summary of the issue, a severity assessment of the issue, a status of the issue, a product involved in the issue, a product version, and a detailed description of the issue. In other embodiments, other fields can be incorporated into the standardized format as case management systems evolve.

The translator engine can be configured to implement classes in the translation process. As a non-limiting example, an import, an export or a third party classes can be created. The import classes can be configured to convert data from the standardized format into the native format of the destination CMS system. The export classes can be used to convert the native data format to the standardized format. The third party classes can be used to convert data associated with third party systems. In some embodiments, the classes can be implemented using HTML, XML, CSS style sheets, or other types of mark-up languages.

FIG. 1 illustrates an exemplary system 100 in accordance with various embodiments. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes case management systems ("CMS") 105 and a network 110. CMS 105 can be hosted on a server to provide case management support for support issues generated by a respective user, where the respective user can be a IT support department. CMS software systems are known to those skilled in the art such as Numara Help Desk™, Sinergia Help Desk™, Remedey Help Desk, Issue Tracker, SalesForce.com, etc. In some embodiments, each CMS 105 can be implemented as a different system from another. For example CMS 105a can be a Numara system while CMS 105b can be a Sinergia system.

Each CMS 105 can be coupled to the network 110. Each CMS 105 can be equipped with a network interface to allow communication between each CMS 105 as well as other interested third parties. The network 110 can be a combination of wide area and local area networks such as the Internet. The network 110 can be configured to provide a communication channel between the CMS 105. The network 110 can implement a variety of network protocols to provide the communication channel such as Internet Protocol ("IP") Vx, ATM, SONET, or other similar network protocols.

According to various embodiments, a CMS 105 can execute a translator engine 115. The translator engine 115 can be configured to implement classes in the translation process. As a non-limiting example, an import, an export or a third party classes can be created. The translator engine 115 can use the import classes to convert a data package from a transmitting CMS in the standardized format into the native data format of receiving CMS system. The translator engine 115 can also use the export classes can be used to convert the native data format of the host CMS to the standardized format, a universal CMS data package 120, for transmission to a destination CMS. The translator engine 115 can further use third party classes to convert data associated with third party systems during the export and import processes. More particularly, since an institutional IT department may have a variety of application and hardware platforms, a support ticket can have multiple vendors listed to resolve a particular issue.

Figure 2:
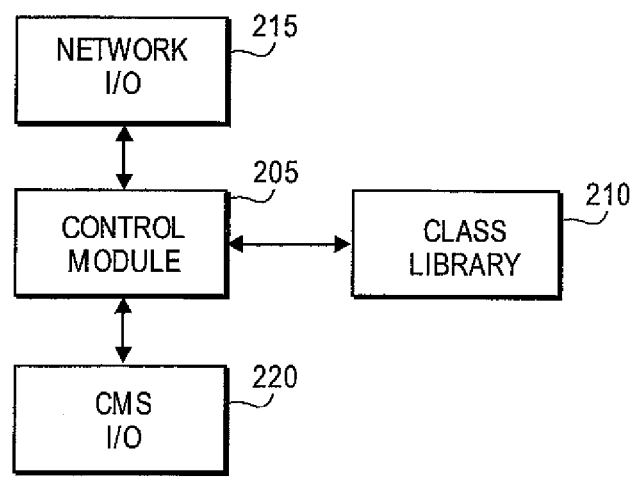
FIG. 2 illustrates an exemplary block diagram of the translator engine in accordance with various embodiments.

FIG. 2 illustrates a more detailed block diagram of the translator engine 115 in accordance with various embodiments. It should be readily apparent to those of ordinary skill in the art that the translator engine 115 depicted in FIG. 2 represents a generalized schematic illustration and that other components may be added or existing components may be removed or modified.

As shown in FIG. 2, the translator engine 115 can comprise a control module 205, a class library 210, a network interface 215, and a CMS interface 220. It should be readily obvious to one of ordinary skill in the art that the depicted modules 205-220 can be implemented as software applications (programmed in C, C++, JAVA, PHP, etc.), hardware components (EEPROM, application specific integrated circuit, microprocessor, etc.) or combinations thereof. The control module 205 can be configured to manage and interface with the other modules 210-220 to provide the functionality of the translator engine 115 as described above and further described herein below.

The control module 205 can be coupled to the class library module 210. The class library module 210 can be configured to store the class libraries being used by the translator engine 105 to convert native data format to the universal CMS format. In some embodiments, the class library 210 can store at least three types of classes: an export class, an import class, and a third-party class. Other classes can be created and used as CMS systems develop and evolve. Various embodiments may implement the classes with mark-up languages such as XML, CSS style sheets, or other similar languages as known to those skilled in the art.

The translator engine 105 can use the export class to translate/convert native data format to the universal CMS format. The translator engine 105 can also use the import class to process the universal CMS format data into the native data format of the host CMS system. The translator engine 105 can further use the third party classes to assist in the processing of data that includes third-party applications and/or hardware platforms from respective vendors.

In some embodiments, the class library module 210 can be implemented with a persistent storage device. Other embodiments of the class library module 210 can be implemented by allocating memory space in the application of the underlying operating system.

The control module 205 can also be coupled to the network interface 215, which provides a connection to the network 110. The network interface 215 provides a mechanism for the control module 205 to determine if any incoming universal CMS format data packages are arriving from transmitting CMS systems. Similarly, the control module 205 can transmit universal CMS format data packages to destination CMS systems.

The control module 205 can be configured to be further coupled to the CMS interface 220. The CMS interface 220 can be an application program interface ("API") that allows the control module 205 to receive/transmit native data format packages from the CMS 105.

Accordingly, the control module 205 can be configured to use the export classes from the class library module 210 to convert the native data format of the host CMS to the standardized format for transmission to a destination CMS through the network interface 215. The control module 205 can also use the import class from the class library module 215 to process an incoming universal CMS format data package received through the network interface 210. The control module 205 can further use third party classes to convert data associated with third party systems during the export and import processes.

FIG. 3 depicts a block diagram of the universal CMS protocol in accordance with various embodiments. It should be readily apparent to those of ordinary skill in the art that the universal CMS format depicted in FIG. 3 represents a generalized schematic illustration and that other fields may be added or existing fields may be removed or modified.

As shown in FIG. 3, the universal CMS protocol can comprise a case-identification field 305, a case-owner field 310, a case-summary field 315, a case severity field 320, a case-status field 325, a case product field 330, a case product version field 335, a case description field 340, a universal identification ("ID") field 345, an origin field 350, and a destination field 355.

The case-identification field 305 can be configured to store an identification number or alpha-number series that uniquely identifies an issue generated by a user. The case-owner field 310 can store the support engineer assigned to resolve the issue. The case-summary field 315 can be configured to store a short summary of the problem description. This field 315 can be limited to user-determined number of spaces. The case-severity field 320 can be configured to store a rating of how severity of the issue. The case-status field 325 can store the resolution status of the issue. The case-product field 330 can be configured to store the identity of the product. The case-product version field 335 can be configured to store information that version of the product listed in case-product field 330. The case-description field 340 can be configured to store more detailed information regarding the issue. For example, this field 340 can contain more detailed information related to operating system version, hardware characteristics, number of users, secure or non-secure environment, etc.

The universal ID field 345 can be configured to store a unique identifier given to each package. The unique identifier can be generated pseudo-randomly, sequential or some other heuristic. The universal ID field 345 can persist through the classes. The origin field 350 can be configured to provide an identification of the transmitter of the universal CMS data package. The destination field 355 can be configured to provide an identification of the destination of the CMS system. This field 355 can hold multiple destinations.

Figure 3C:
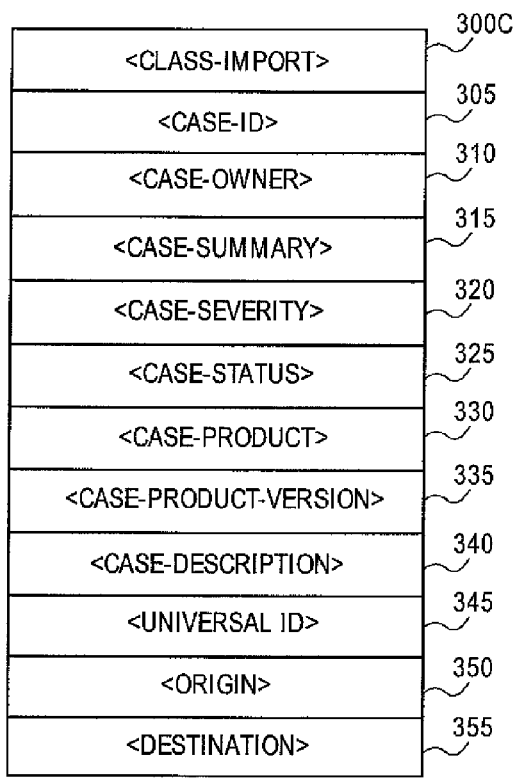
Figure 3D:
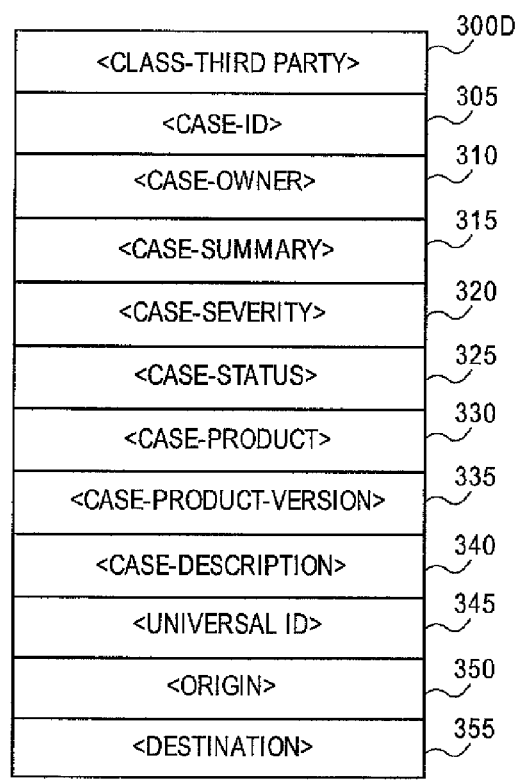

FIG. 3B-D illustrates block diagram of classes in accordance with various embodiments. It should be readily apparent to those of ordinary skill in the art that the classes 305B-D depicted in FIG. 3B-D represent a generalized schematic illustration and that other elements may be added or existing elements may be removed or modified.

As shown in FIG. 3B, the export class 305B can comprise the elements of case-identification field 305, case-owner field 310, case-summary field 315, case-severity field 320, case-status field 325, a case product field 330, case product version field 335, a case-description field 340, universal ID field 345, origin field 350, and destination field 355. Similarly, the import class 305C (see FIG. 3C) and third party class 305D (see FIG. 3D) can comprise the elements of case-identification field 305, case-owner field 310, case-summary field 315, case-severity field 320, case-status field 325, a case product field 330, case product version field 335, a case-description field 340, universal ID field 345, origin field 350, and destination field 355.

Figure 4:
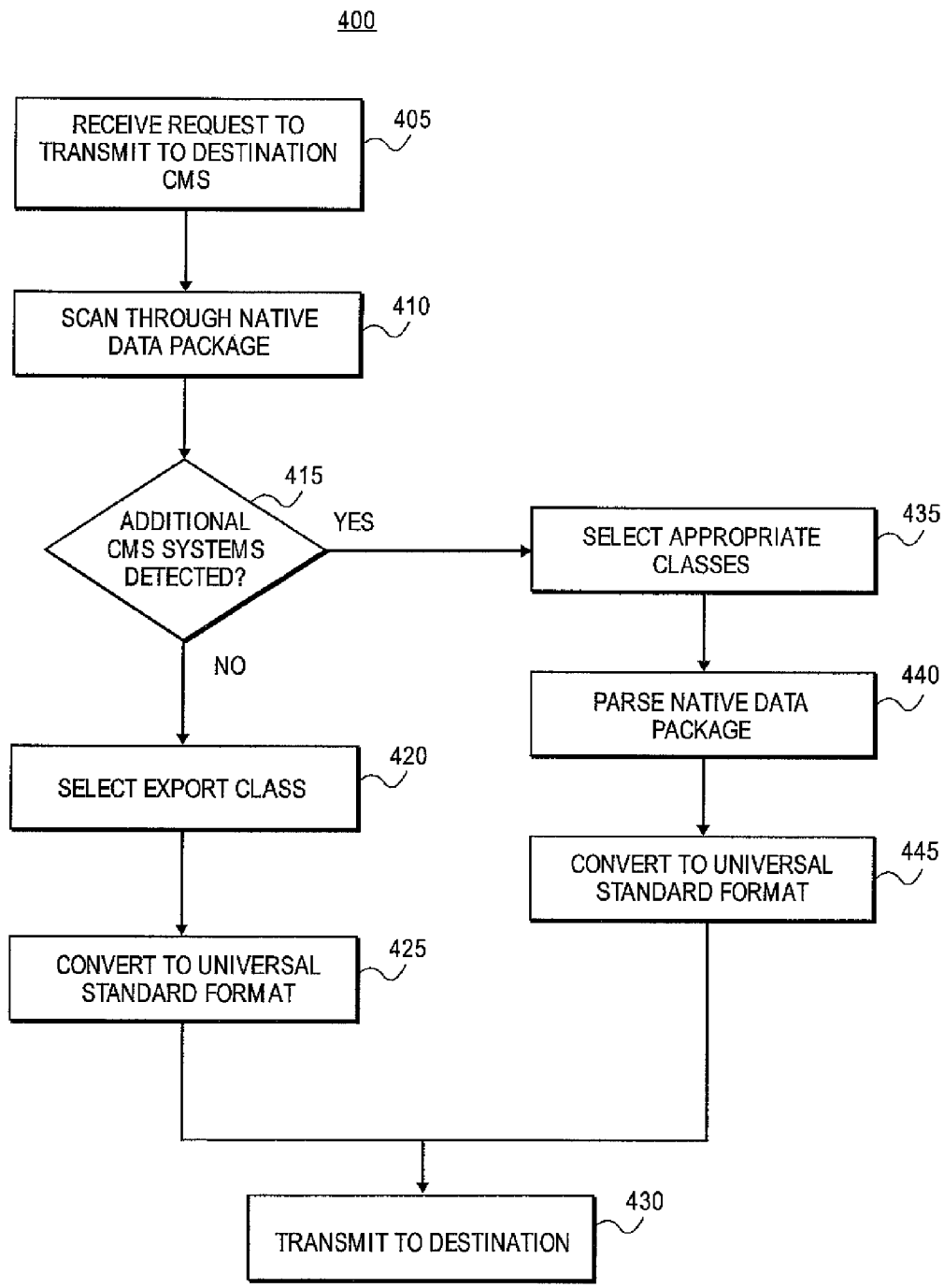
FIG. 4 illustrates an exemplary flow diagram in accordance with various embodiment.

FIG. 4 illustrates an exemplary flow diagram 400 executed by the translator engine 115 in accordance with various embodiments. It should be readily apparent to those of ordinary skill in the art that the flow diagram 400 depicted in FIG. 4 represents a generalized schematic illustration and that other steps may be added or existing steps may be removed or modified.

As shown in FIG. 4, the control module 205 of the translator engine 105 can be configured to receive a request to transmit data to a destination CMS, in step 405. For example, a support engineer may wish to send a support ticket to a supporting vendor for assistance on a particular issue.

In step 410, the control module 205 can be configured to parse through the native data package of the host CMS system. In step 415, the control module 205 determines whether any additional vendors (CMS systems) are included in the native data package. If the control module 205 determines that there is only the destination CMS system, the control module 205 can be configured to select the export class from the class library module 210, in step 420. The control module 205, in step 425, can then be configured to convert the native data package into a universal CMS data package using the export class. Subsequently, the control module 205 can transmit the universal CMS data package through the network interface 215 to the destination CMS system, in step 430.

Returning to step 415, if the control module 205 determines that there are additional CMS systems in the native data package, the control module 205 can be configured to select the appropriate classes for the detected additional CMS systems, in step 435.

The control module 205, in step 440, can be configured to parse the native data package to separate the data associated with each CMS system. In step 445, the control module 205 can convert the separated data into a universal CMS data package by using the selected classes from step 435. Subsequently, the control module 205 can go to the processing of step 430.

Figure 5:
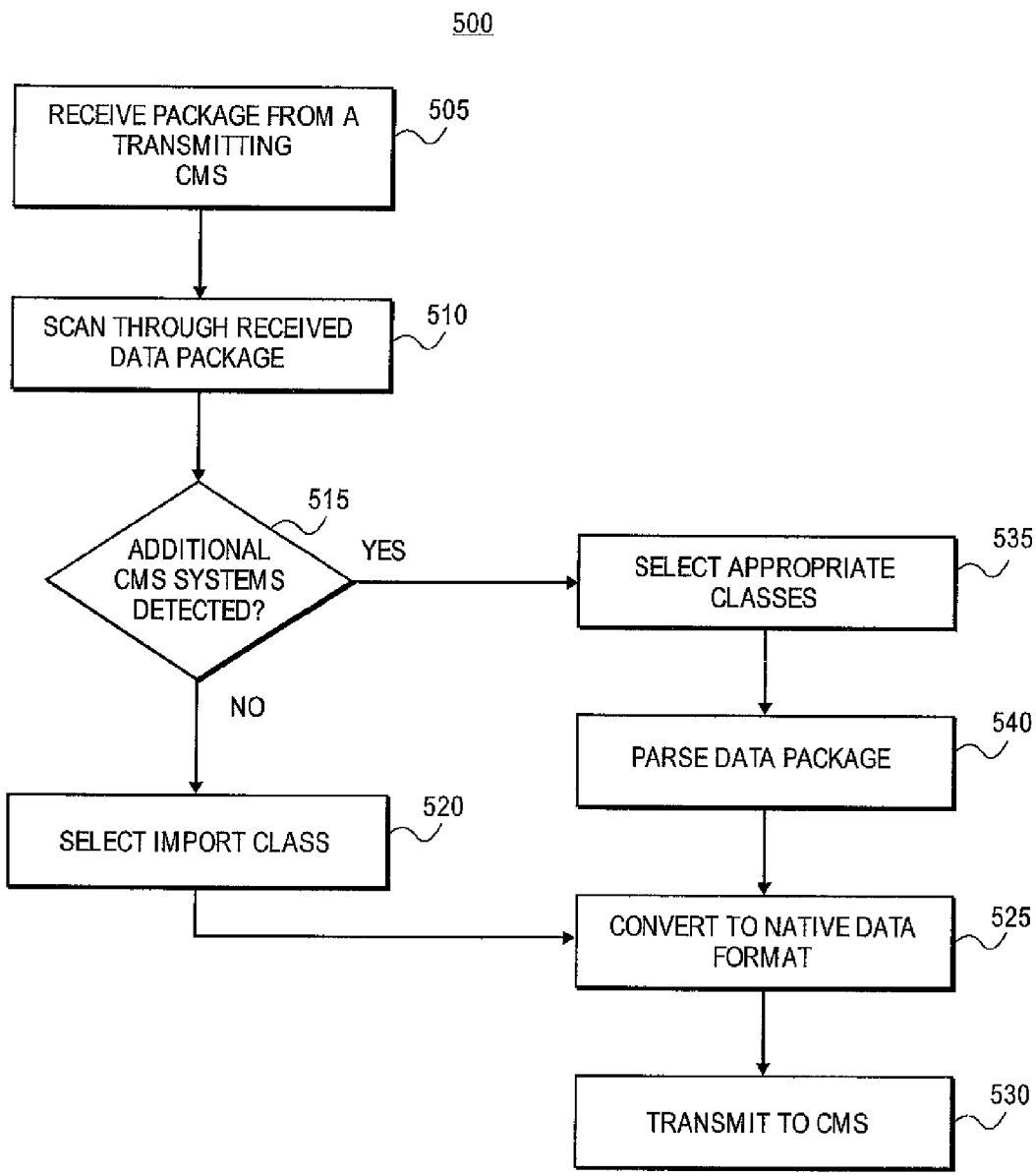
FIG. 5 depicts another exemplary flow diagram in accordance with various embodiment.

FIG. 5 illustrates an exemplary flow diagram 500 executed by the translator engine 115 in accordance with various embodiments. It should be readily apparent to those of ordinary skill in the art that the flow diagram 500 depicted in FIG. 5 represents a generalized schematic illustration and that other steps may be added or existing steps may be removed or modified.

As shown in FIG. 5, the control module 205 of the translator engine 105 can be configured to receive a universal CMS data package from a transmitting CMS system, in step 505. In step 510, the control module 205 can be configured to parse through the universal CMS data package. In step 515, the control module 205 determines whether any additional vendors (CMS systems) are included in the universal CMS data package. If the control module 205 determines that there is only the destination CMS system, the control module 205 can be configured to select the import class from the class library module 210, in step 520. The control module 205, in step 525, can then be configured to convert the universal CMS data package into the native format of the host CMS system using the import class. Subsequently, the control module 205 can transmit the native data package through the CMS interface 220 to the destination CMS system, in step 430.

Returning to step 515, if the control module 205 determines that there are additional CMS systems in the universal CMS data package, the control module 205 can be configured to select the appropriate classes for the detected additional CMS systems, in step 535.

The control module 205, in step 540, can be configured to parse the universal CMS data package to separate the data associated with each CMS system. In step 445, the control module 205 can convert the separated data into a native data format by using the selected classes from step 535. Subsequently, the control module 205 can go to the processing of step 530.

Figure 6:
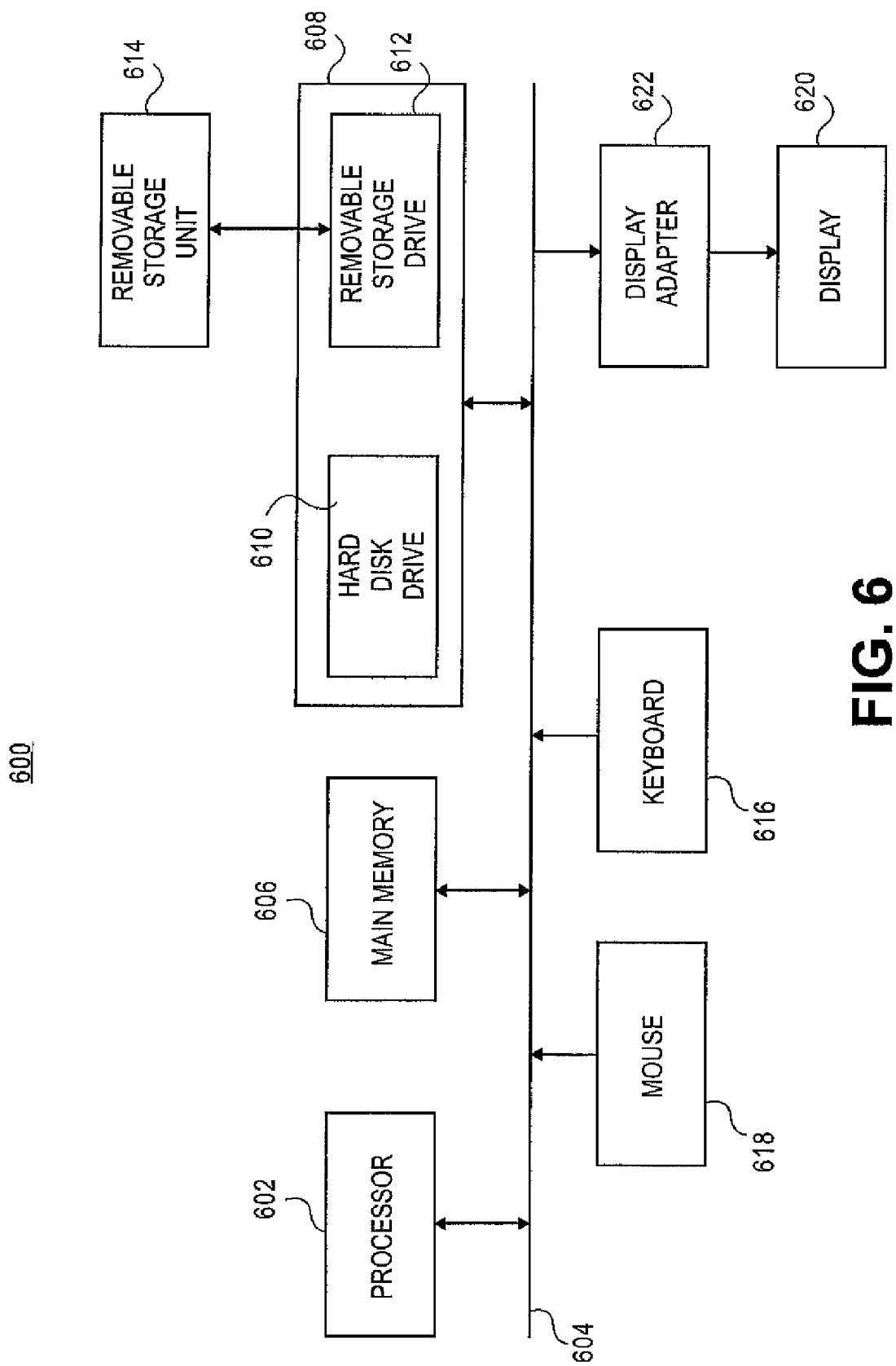
FIG. 6 depicts an exemplary computing platform in accordance with yet another embodiment.

FIG. 6 illustrates an exemplary block diagram of a computing platform 600 where an embodiment may be practiced. The functions of the translator engine 115 may be implemented in program code and executed by the computing platform 600. The translator engine 115 may be implemented in computer languages such as PASCAL, C, C++, JAVA, etc.

As shown in FIG. 6, the computer system 600 includes one or more processors, such as processor 602 that provide an execution platform for embodiments of the translator engine 115. Commands and data from the processor 602 are communicated over a communication bus 604. The computer system 600 also includes a main memory 606, such as a Random Access Memory (RAM), where the translator engine 115 may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the translator engine 115 may be stored. The removable storage drive 612 reads from and/or writes to a removable storage unit 614 in a well-known manner. A user interfaces with the translator engine 115 with a keyboard 616, a mouse 618, and a display 620. The display adapter 622 interfaces with the communication bus 604 and the display 620. The display adapter 622 also receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of communication between multiple case management systems, the method comprising:
    detecting, by a processor, a trouble ticket in a format of a first case management system, wherein the trouble ticket comprises respective data for each of at least two destination case management systems;
    parsing the trouble ticket to separate the respective data for each of the at least two destination case management systems;
    converting the separated respective data of the trouble ticket into a standard universal format by using respective export classes of a class library associated with the first case management system, wherein the standard universal format enables each of the at least two destination case management systems to translate the converted trouble ticket into respective formats of the second at least two destination case management systems; and
    transmitting the converted trouble ticket to the at least two destination case management system systems.

2. The method of claim 1, wherein the at least two destination case management systems translate the converted trouble ticket to the respective formats of the at least two destination case management systems using respective import classes of class libraries associated with the at least two destination case management systems.

3. A system for communication between multiple case management systems, the system comprising:
    a plurality of case management systems;
    a processor configured to execute a translator engine of a first case management system, wherein the translator engine is configured to detect a trouble ticket in a format of the first case management system, wherein the trouble ticket comprises respective data for each of at least two destination case management systems; parse the trouble ticket to separate the respective data for each of the at least two destination case management systems; convert the separated respective data of the trouble ticket into a standard universal format using respective export classes of a class library associated with the first case management system, wherein the standard universal format enables each of the at least two destination case management systems to translate the converted trouble ticket into respective formats of the at least two destination case management systems; and transmit the converted trouble ticket to the at least two destination case management systems.

4. The system of claim 3, wherein the class library is configured to store a plurality of classes, each class of the plurality of classes associated with a respective case management system of the plurality of case management systems.

5. The system of claim 3, wherein the at least two destination case management systems translate the converted trouble ticket using respective import classes of class libraries associated with the at least two destination case management systems.

6. An apparatus for providing communication services for case management systems, the apparatus comprising:
    a translator engine configured to detect a trouble ticket in a native format of a case management system, wherein the trouble ticket comprises respective data for each of at least two destination case management systems; parse the trouble ticket to separate the respective data for each of the at least two destination case management systems; and convert the separated respective data of the trouble ticket from the native data format of the case management system to a universal standard package, wherein the universal standard package enables each of the at feast two destination case management systems to translate the converted trouble ticket into respective native formats of the at least two destination case management systems;
    a class library coupled to the translator engine, wherein the class library is configured to store a plurality of classes, each class associated with a respective case management system and to be accessible to the translator engine to convert the trouble ticket; and
    a network interface configured to be coupled to the translator engine for transmission of the converted trouble ticket to the at least two destination case management systems.

7. The apparatus of claim 6, wherein the universal standard package conforms with a universal standard format.

8. The apparatus of claim 7, wherein the translator engine is further configured to determine the at least two destination case management systems and select at least two classes from the class library based on the at least two destination case management systems.

9. The apparatus of claim 8, wherein the translator engine is further configured to determine a secondary case management system and to select a second class from the class library based on the secondary case management system.

10. The apparatus of claim 9, wherein the translator engine is further configured to convert a portion of the trouble ticket to the universal standard format based on the second class as a supplemental universal standard package.

11. The apparatus of claim 10, wherein the translator engine is further configured to package the universal standard package with the supplemental universal standard package to the at least two destination case management systems.

* * * * *